United States Patent Office 3,513,478
Patented May 19, 1970

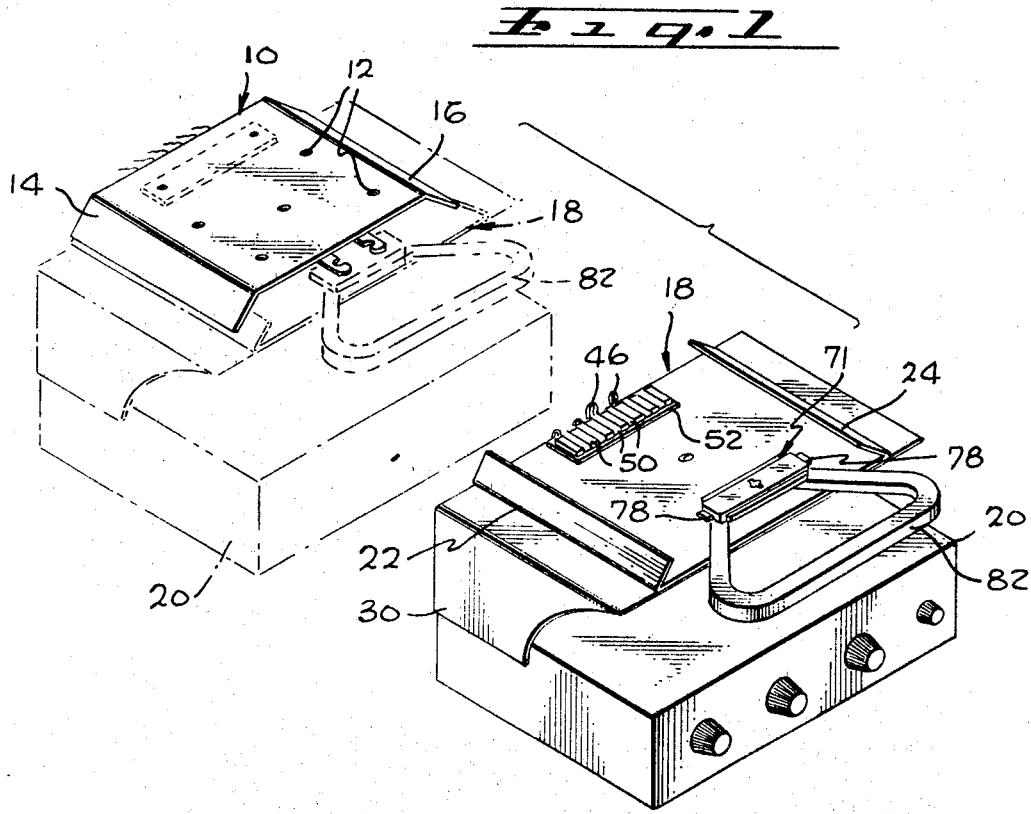
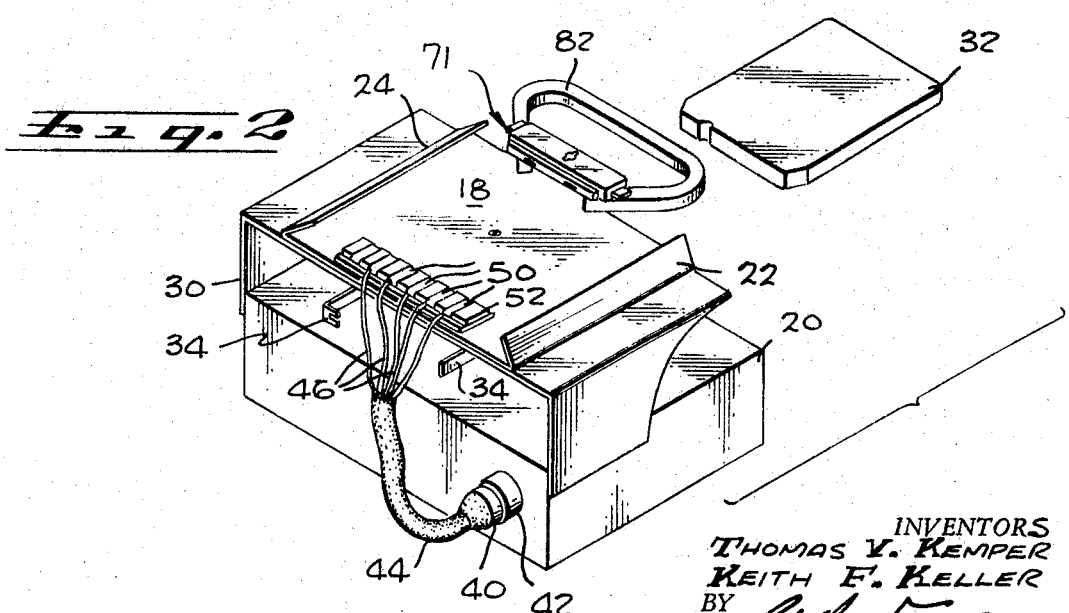

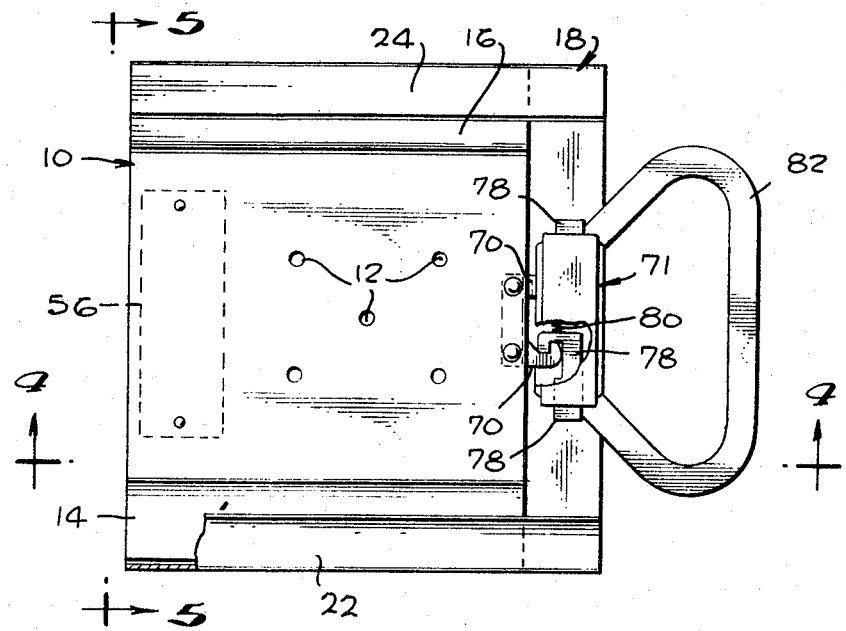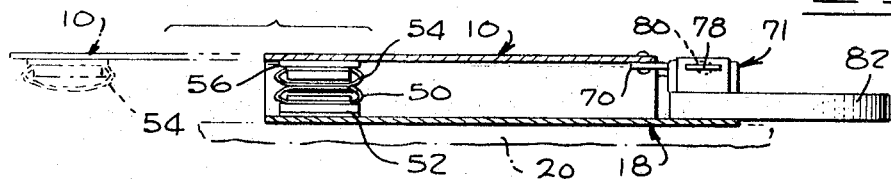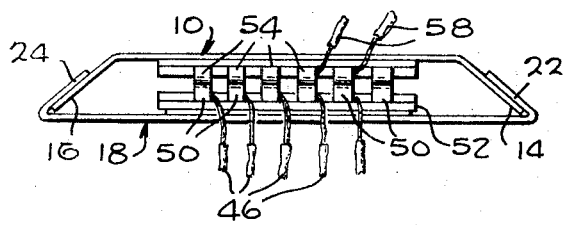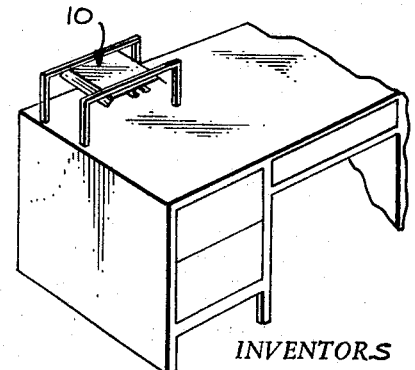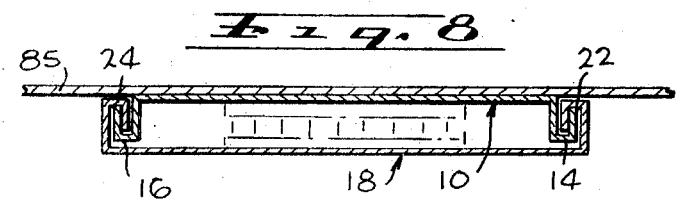

3,513,478
MULTIPLE PURPOSE REMOVABLE ELECTRICAL
MOUNTING BRACKET
Thomas V. Kemper and Keith F. Keller, Los Angeles,
Calif., assignors to Kustom Kreations, Inc., Northridge, Calif.
Filed Oct. 24, 1968, Ser. No. 778,373
Int. Cl. H01r 13/54
U.S. Cl. 339—91                     8 Claims

ABSTRACT OF THE DISCLOSURE

Apparatus is described for removably mounting an electrical appliance to the dashboard of an automobile, or the like. The apparatus includes a stationary plate firmly affixed to the underside of the dashboard. Downwardly projecting flanges are formed at opposite edges of this plate. A removable plate is secured to the appliance and has upwardly projecting flanges formed along its opposite edges and adapted to engage slidably the downwardly projecting flanges on the stationary plate. Electrical terminals on the stationary plate are connected to the electrical system of the vehicle, and matching terminals on the removable plate are connected to the appliance. The two sets of terminals are releasably engaged in electrical contact when the two plates are slidably engaged with one another. Releasable locking means are provided on the stationary plate and removable plate for locking the two plates together when they are in slidable engagement.

This invention relates to mounting apparatus and more particularly to a novel and improved apparatus for disengageably mounting an electrical appliance to a stationary object or the like.

It is becoming common practice to install electrical appliances such as stereo tape systems, special radio receivers and transmitters, and even television sets in automobiles, boats and aircraft. Since these appliances are accessories, added after the vehicles' manufacture, they are generally secured under the dashboard or instrument panel or in some other convenient location in a semipermanent manner by means of brackets held in place by bolts or screws.

This semi-permanent mounting arrangement has several disadvantages. For example, if the vehicle is left unattended or unlocked, the appliance may readily be disconnected and stolen merely by the removal of the attaching screws. On the other hand, unless the owner is willing to go to the trouble of detaching and reattaching it, he cannot use his appliance except when he is in or near the vehicle.

The subject invention recognizes the desirability of providing mounting means which permit the owner quickly and easily to remove the appliance from its stationary position in the vehicle and to carry it with him when he leaves the vehicle. In addition it affords means by which the appliance may conveniently be mounted for use at various remotely located stationary positions.

Briefly described the present invention provides a first mounting bracket which is permanently affixed to a structure, as for example the underside of the dashboard of an automobile. A second mounting bracket is permanently affixed to an electrical appliance. The mounting brackets include means for slidable engagement with one another. Each mounting bracket includes electrical terminals which are brought into electrical contact with one another when the brackets are in slidable engagement. The terminals on the first bracket are connected to an electrical power source, while those on the second bracket are connected to the appliance. Releasable locking means are provided on each bracket for locking the mounting brackets to one another when they are fully engaged.

One object of this invention is to provide a novel and improved mounting bracket for electrical appliances.

Another object is to provide a sturdy, inexpensive, easy to operate mounting apparatus for releasably attaching an electrical appliance to a structure and connecting the appliance to a source of electrical current associated with that structure.

Another object is to provide mounting means of this type which permit the appliance to be attached to structures and connected to power supplies at various remote locations.

Still another object is to provide such mounting bracket having releasable locking means for securing the appliance against accidental or unauthorized removal.

These and other objects, features and advantages will become more apparent to those skilled in the art from a consideration of the following detailed description, wherein like reference numerals indicate like or corresponding parts throughout the several views and wherein:

FIG. 1 is a front perspective view of the mounting brackets of one preferred embodiment of this invention showing their engaging relationship.

FIG. 2 is a rear perspective view of one of the engageable mounting brackets of FIG. 1;

FIG. 3 is a top plan view of the engageable mounting bracket of the apparatus shown in FIGS. 1 and 2;

FIG. 4 is a sectional view of the engageable mounting brackets taken along the lines 4—4 of FIG. 3 and illustrating the engagement of the electrical terminals of one preferred embodiment;

FIG. 5 is a view taken along the lines 5—5 of FIG. 3 showing the electrical terminals in engagement;

FIG. 6 illustrates an alternative embodiment of the electrical means of the invention;

FIG. 7 is a perspective view illustrating a stationary mounting bracket positioned on the top of a desk; and FIG. 8 is an end view of another embodiment of the invention illustrating an alternative configuration of the mounting brackets.

Turning now to a more detailed description of this invention there is shown in FIG. 1 a mounting plate 10 which is permanently attached to the under portion of the dashboard of an automobile (not shown), or the like. Holes 12 in the plate 10 are provided for attachment screws or bolts. Flanges 14 and 16 are formed along the edges of plate 10 to project downwardly at an angle from the stationary dashboard member to which the plate 10 is attached.

A removable plate 18 is shown secured to an electrical appliance 20, such as an automobile stereo tape player or radio. The edges of plate 18 are bent at an angle to form upwardly projecting converging flanges 22 and 24. The angled flanges 22 and 24 of removable plate 18 are engageable with the flanges 14 and 16 respectively of stationary plate 10. The engagement is accomplished by the flanges 22 and 24 sliding over the flanges 14 and 16 respectively as shown in phantom lines in FIG. 1. Full engagement of the brackets 10 and 18 is shown in FIG. 3.

For use with a top-loading tape player, a bracket 30 is mounted on the appliance 20, preferably by welding, to provide access for loading a tape cartridge 32 into its receiver 34. Removable mounting plate 18 is fastened to the top of bracket 30, likewise preferably by welding.

It should be understood that the configuration and operational requirements of the particular appliance may require a modified form of bracket 30, or may allow it to be eliminated entirely and the removable mounting plate 18 secured directly to the appliance case itself.

A conventional releasable locking mechanism 71 is provided to assure that the plates 10 and 18 remain in engagement until ready to be removed. The mechanism 71 comprises a pair of dogs 70 secured to the stationary plate 10. The dogs 70 have hook-ends facing each other. A pair of catches 78 are slidably mounted on the removable plate 18. The catches 78 include hooks on the ends thereof which are capable of engaging the hooks of the dogs 70 as shown in FIG. 3. The catches 78 may be spring loaded so that they remain engaged with the dogs 70 until released by manual pressure exerted inwardly to overcome the spring 80 therein.

If desired, locking mechanism 71 may be provided with additional key or combination locking means (not shown) to prevent theft.

As shown more clearly in FIGS. 4 and 5, means are provided on removable mounting plate 18 to make electrical connection with the appliance 20. These means include an electrical plug 40, which is inserted into an electrical socket 42 in the appliance 20. A cable 44 carries a plurality of electrical wires 46 from plug 40 to a plurality of electrical contacts 50 which are individually coupled to selected ones of the wires 46. The electrical contacts 50 are mounted to an insulated terminal block 52 which in turn is secured to one side of the plate 18. A similar plurality of electrical contacts 54, matching contacts 50, are connected to an insulated terminal block 56 which in turn is secured to the side of stationary mounting plate 10 adjacent plate 18. The contacts 54 in turn are coupled to power supplies, foot operated controls, antennas (if appliance 20 is a radio), or the like through the wires 58.

The contacts 50 and 54 are preferably sliding contacts, which may be in the form of leaf springs, which compress against one another when the plates 10 and 18 are in engagement with each other thereby assuring good electrical connection therebetween.

With reference to FIG. 6 there is shown an alternative form of electrical connection 62. This alternative comprises a pin and socket arrangement. A plug 64 having a plurality of pins 66 protruding therefrom is secured to the underside of stationary plate 10. A plug 68 having a plurality of sockets which receive the pins 66 of plug 64 when the plates 10 and 18 are in slidable engagement is secured to the adjacent face of plate 18.

A carrying handle 82 is secured to the removable plate 18 which allows the appliance 20 when detached from the stationary plate 10 to be carried conveniently by hand.

To make the appliance 20 truly portable, additional stationary plates 10 may be installed at selected remote locations, as for example secured to a desk top 84 by means such as the structure shown in FIG. 7, whereby the appliance can be locked into place for convenient use.

FIG. 8 illustrates one of several alternative configurations for the flanges 14, 16, 22 and 24. In this embodiment of the invention, flanges 14 and 16 on the stationary plate 10 are in the form of U-shaped channels, and flanges 22 and 24 on the removable plate 18 are in the form of inverted U's, the free ends of which are adapted to slidably engage the channels of flanges 14 and 16. The underside of the dashboard or other supporting structure 85 serves to maintain flanges 22 and 24 in engagement with flanges 14 and 16.

What is claimed is:
1. Apparatus for removably mounting an electrical appliance to a supporting structure comprising:
   a first mounting plate affixed to said supporting structure and having flanges formed thereon extending away from said supporting structure;
   a second mounting plate adapted to be affixed to said appliance having flanges formed extending away from said appliance when said second mounting plate is so affixed and adapted to cooperate slidably with the outwardly extending flanges of said first plate;
   a first set of electrical contacts on said first mounting plate, at least one of said contacts being electrically connected to a source of electric current; and
   a second set of electrical contacts on said second mounting plate adapted to be connected electrically to said appliance and positioned to make electrical connection with said first set of contacts only when said second mounting plate is fully engaged with said first mounting plate, and so that no contact on said second mounting plate will engage any contact on said first mounting plate when said second and first mounting plates are not so fully engaged.

2. The apparatus as defined in claim 1 in which:
   the flanges on said first mounting plate are formed along opposite edges thereof and form divergent obtuse angles with the face of said plate; and
   the flanges on said second mounting plate are formed along opposite edges thereof and form converging acute angles with the face of said second mounting plate adjacent said first mounting plate.

3. The apparatus as defined in claim 1 in which:
   the flanges on said first mounting plate form U-shaped channels; and
   the flanges on said second mounting plate form inverted U-shaped channels, having their ends adapted to engage slidably the U-shaped channels of said first mounting plate.

4. The apparatus as defined in any one of claims 1, 2 and 3 further comprising releasable locking means for coupling said first mounting plate to said second mounting plate when said plates are fully engaged with one another.

5. The apparatus as defined in any one of claims 1, 2 and 3 further comprising a handle attached to said second mounting plate for slidably removing and engaging said second mounting plate in relation to said first mounting plate.

6. The apparatus as defined in any one of claims 1, 2 and 3 further comprising:
   a handle coupled to said second mounting plate for engaging and removing said second mounting plate in relation to said first mounting plate; and
   locking means for releasably coupling said first mounting plate to said second mounting plate when said plates are fully engaged with one another.

7. The apparatus as defined in any one of claims 1, 2 and 3 in which said first and second sets of electrical contacts comprise a plurality of electrically conductive leaf springs tensioned to bow away from the adjacent faces of said first and second mounting plates, respectively, and electrically insulated from said plates, respectively.

8. The apparatus as defined in any one of claims 1, 2 and 3 in which said first set of electrical contacts comprise a plurality of electrically conductive pins, electrically insulated from said first mounting plate, and said second set of electrical contacts comprise a plurality of sockets, adapted to receive said pins and to make electrical contact therewith, said sockets being electrically insulated from said second mounting plate.

(References on following page)

References Cited

UNITED STATES PATENTS

| | | | |
|---|---|---|---|
| 661,986 | 11/1900 | Heizer | 248—224 |
| 1,386,884 | 8/1921 | McKay | 339—120 |
| 1,826,162 | 10/1931 | Balk | 248—224 |
| 2,189,874 | 2/1940 | Ziganke | 339—65 |
| 2,771,263 | 11/1956 | Boho | 248—298 |
| 2,897,033 | 7/1959 | Ford | 312—320 |
| 3,118,713 | 1/1964 | Ellis | 339—12 |
| 3,264,601 | 8/1966 | Hartholz | 339—176 |

RICHARD E. MOORE, Primary Examiner

J. H. McGLYNN, Assistant Examiner

U.S. Cl. X.R.

339—135